United States Patent [19]
Krapf

[11] 3,749,463
[45] July 31, 1973

[54] BEARING MOUNTING METHOD AND APPARATUS

[76] Inventor: John Krapf, 29 Shelter Ln., Levittown, Pa.

[22] Filed: Oct. 13, 1970

[21] Appl. No.: 80,406

[52] U.S. Cl. ............................................. 308/236
[51] Int. Cl. ......................................... F16c 33/00
[58] Field of Search...................... 308/236; 74/325

[56] References Cited
UNITED STATES PATENTS

| 1,788,367 | 1/1931 | Beringer | 308/236 |
| 2,043,783 | 6/1936 | Tyler | 308/236 |
| 1,834,790 | 12/1931 | Logue | 308/236 |
| 1,709,439 | 4/1929 | Morris | 308/236 |

Primary Examiner—Charles J. Myhre
Assistant Examiner—Frank Susko
Attorney—Synnestvedt & Lechner

[57] ABSTRACT

A bearing is mounted to a casing by undercutting the casing adjacent a shaft aperture to form a recessed shoulder, inserting a bearing mounting sleeve having an outer flange at one end and inner bearing retaining means at the other end into the aperture so that the flange is against the shoulder, and inserting the bearing into the sleeve against the bearing retaining means. The invention is particularly useful in repairing damaged transmissions of the type including output transfer gears.

5 Claims, 4 Drawing Figures

PATENTED JUL 31 1973  3,749,463

INVENTOR.
JOHN KRAPF
BY Synnestvedt & Lechner
ATTORNEYS

BEARING MOUNTING METHOD AND APPARATUS

BACKGROUND OF THE INVENTION

This invention relates generally to bearing mountings, and, more particularly, is directed to an improved method and apparatus for mounting bearings to vehicular transmission casings.

This invention was developed in response to a problem arising in vehicular transmissions for so called "disposable" vehicles having four wheel drive. The term "disposable" vehicle refers to vehicles which are designed to operate for a limited period of operation, such as for example 10,000 miles. A typical example is a military vehicle commonly referred to as a quarter ton, which is employed in great quantity by our military in remote regions of the world. One of the primary considerations in the design of these vehicles is economy of manufacture.

Since these vehicles are normally required to have four wheel drive, their transmissions must include means for coupling the engine to both the front and rear wheels of the vehicle. In most vehicles having four wheel drive, this function is performed by a transfer assembly separate from the primary transmission of the vehicle which selectively couples the main vehicle drive to the front wheels. The transmissions in disposable vehicles, however, include a transfer assembly integral with the primary transmission. The latter type of transfer assembly includes a take-off gear mounted on the output shaft of the transmission which, through an idler gear, drives an output transfer gear mounted to the main drive shaft of the vehicle, which shaft is in turn journaled for rotation in the transmission casing.

The method heretofore employed to rotatably mount the drive shaft and output transfer gear to the transmission casing provided an inner bearing positioned inside of the transfer gear and loosely inserted in the transmission casing, an outer bearing positioned outside of the transfer gear and retained against outward axial movement in a transfer assembly housing, and a snap ring located outside of the outer bearing to provide the sole means for preventing inward axial movement of the drive shaft relative to the transmission.

This arrangement has proven to be drastically inadequate for its intended purpose. The torque produced on the drive shaft by acceleration and deceleration of the vehicle tend to force the drive shaft into the transmission. Under the previous arrangement, the snap ring preventing axial movement of the drive shaft frequently has prematurely failed so that the drive shaft is released and the transfer gear is forced into the transmission casing. Since the casing is normally formed from a relatively soft material such as cast iron while the output transfer gear is fabricated of a harder substance such as carbon steel, continued rotation of the released gear causes it to score or gouge the outer casing surface. Under these conditions, the transmission becomes locked or frozen so that it cannot be shifted to another gear. The vehicle is thus rendered inoperable long before it has completed its intended period of service.

It has heretofore been impossible to repair the damaged casing and thus it has been necessary to replace the transmission casing in order to return the vehicle to an operative condition. This procedure is expensive because of the high cost of the replacement casings and of the labor necessary for their installation. Moreover, once the repair has been completed, the transmission is again prone to the same type of failure so that there is an excellent chance that frequent and expensive subsequent repairs will be necessary. If the breakdown occurs in an area where replacement parts are not available, as at remote military installations, the vehicle may even have to be scrapped.

It is therefore, highly desirable to provide a method and apparatus for quickly and inexpensively repairing the damaged casing, while at the same time increasing the resistance of the repaired transmission to failure under axial stress over a protracted period of time.

SUMMARY OF THE INVENTION

In accordance with my invention, the inner bearing for the transfer gear drive shaft assembly is installed in the transmission casing by forming an annular sleeve receiving recess about a drive shaft aperture formed in the casing, inserting a generally annular sleeve that includes bearing retaining means in the annular recess, and securing the bearing within the sleeve in engagement with the bearing retaining means.

The preferred sleeve of my invention includes a hollow cylindrical barrel section, an outwardly extending flange disposed generally at one end of the barrel, and inwardly extending bearing retaining means disposed generally at the other end of the barrel. The sleeve is desirably fabricated of a material harder than that from which the casing is formed, and most preferably is of the same material as the output transfer gear.

When the transmission has been rendered inoperable in the manner described above, my invention may be employed to quickly and economically repair the transmission. The damaged casing may be salvaged by merely undercutting the damaged portion of the casing with readily available metal removing equipment to form the sleeve receiving recess, inserting the sleeve into the prepared recess, and then securing the bearing within the sleeve. The resulting bearing mounting has proven to be far stronger and more resistant to failure under axial loading than those previously employed, so that the prospect of subsequent repairs of this nature is essentially obviated.

The invention may, of course, also be employed in the initial manufacture of transmissions to eliminate failures at this point in the device.

BRIEF DESCRIPTION OF THE DRAWINGS

These and further objects, features and advantages of the invention will become more apparent as the following detailed description of the preferred embodiment thereof proceeds with continued reference to the accompanying drawings wherein.

Figure 1:
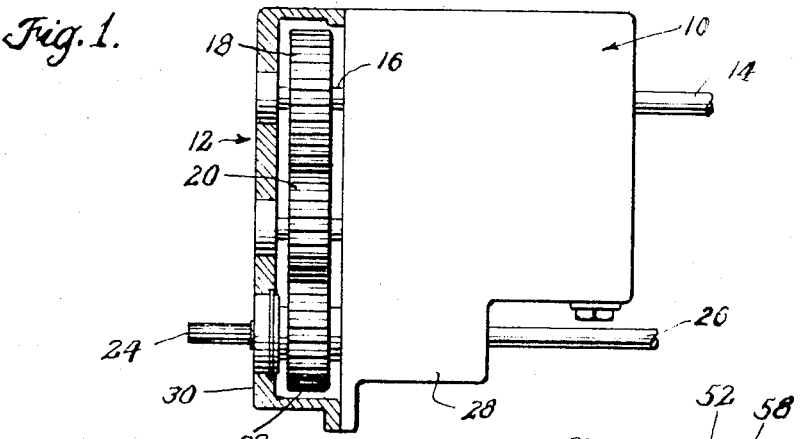
FIG. 1 is schematic representation in side elevation of a vehicular transmission having an integral transfer assembly in which the transfer assembly housing is broken away to show the transfer mechanism.

Referring initially to FIG. 1, a transmission 10 of the type having an integral transfer assembly 12 is therein shown schematically. The transmission 10 houses a conventional set of transmission gears to transfer power from an engine via input shaft 14 to an output shaft 16 at selected ratios of input shaft 14 to output shaft 16 rotational speeds.

The integral transfer assembly 12 includes a take-off gear 18 mounted on the output shaft 16, which through idler gear 20, drives a transfer gear 22 mounted on a drive shaft 24. The drive shaft 24 may be coupled by conventional means to the rear wheels of the vehicle to drive same, and may also be coupled to a forward wheel drive shaft 26 to provide four wheel drive when desired. A conventional shifting collar is provided in the lower portion 28 of the transmission 10 to couple the main drive shaft 24 to the forward drive shaft 26 when desired. A transfer assembly housing 30 is secured to the transmission casing 10 to house and support the gears 18, 20 and 22 of the transfer assembly.

Workers in the art will readily recognize shaft 16 and its associated transmission elements as comprising a conventional "straight" (or two-wheel-drive) transmission for powering a primary drive train (for instance as may also be found in U.S. Pat. No. 1,788,367 to Beringer and further discussed elsewhere); whereas shaft 24 and its associate elements (e.g. gears 18, 20, 22, coupling shaft 24 to be driven by shaft 16) comprise a relatively unusual (though known) "transfer" assembly, arranged to function as a "power take-off" for powering the other (secondary) drive train in a four-wheel drive system. The specific "transfer" of the embodiment is intended primarily as a cost-reduction expedient for use with vehicles which are inexpensive and/or have a quite limited life expectancy and limited repairability. In this connection it will be understood by those skilled in the art that output shaft 16 is selectively coupled to input shaft 14 through a conventional, direct drive clutch arrangement well known in the art (e.g. like clutch 85 in U.S. Pat. No. 1,788,367 to Beringer). Also, main drive shaft 24 is selectively coupled to drive forward drive shaft 26 (as stated) by a conventional shifting collar, SC (not shown but known in the art and analogous to the "reverse shifting collar" means indicated in the cited Beringer patent to couple gear 105 to the idler gear by means of shifter fork 97 and shift rod 91). Collar SC is of course mounted on shaft 24 directly adjacent bearing 32 (on the right thereof, as viewed in FIG. 2), being of a diameter such as can be inserted through the bore for original assembly. Collar SC also has relatively conventional retaining means associated with it whereby it is engaged by stop means on both shafts 24 and 26; as a result, shaft 24 is constrained thereby against "outward" translation away from shaft 26 beyond a prescribed point and transfer bearing 32 is effectively restrained from appreciably "outward" axial displacement. Bearing 32 is restrained against "inward" (rightward) axial displacement by snap-ring 36 alone (as described elsewhere), absent employment of the invention. Thus, bearing 32 may be characterized as "transfer bearing means prone to axial displacement," absent the provision of some restraining means such as adjacent parts which are relatively fixed (as in the prior art) or absent a special "stop means" like the subject double-flange collar embodiment.

The foregoing description of FIG. 1 sets forth the preferred environment for the present invention. The details of the preferred embodiment of the invention may be best appreciated by reference to FIG. 2. The transfer gear 22 has inner splines which mesh with complementary external splines provided on the drive shaft 24. Two bearings are press-fitted onto the drive shaft 24, namely an inner bearing 32 located adjacent the inside edge of the transfer gear 22 and an outer bearing 34 located adjacent the outside edge of the transfer gear 22. Inward axial movement of the drive shaft 24 relative to the transmission is prevented by a snap ring 36 positioned in an appropriate groove formed on the drive shaft 24 adjacent the outer edge of outer bearing 34. Another snap ring 38 is seated in a groove formed in the periphery of the outer bearing 34, which ring cooperates with a recessed shoulder 40 formed on the inner surface of the transfer assembly housing 30 to prevent outward displacement of the drive shaft 24. Snap rings have very limited usefulness. They are prone to "pop-out" of their seating groove all too commonly and thus lose all functional effectiveness. For instance, ring 36 has been observed to commonly "pop-out" of its seating groove in shaft 24, under commonly-occuring thrust stresses, allowing bearing 34 to "wander" axially inward, along with shaft 24 and gear 22 thereon. It can be appreciated that this, in turn, allows gear 22 (or like "driven means") to impact adjacent surfaces with obviously catastrophic results. Spring "hold down" means have been employed in an effort to retain ring 36 in position; however with very limited success. Other analogous "removable holding means" may be contemplated for placement on shaft 24 to maintain the position of elements thereon while yet permitting the convenient assembly and/or disassembly of the unit —all of which will be limited in their ability to avoid the described problems if present practise is any guide. Of course, this transfer unit must be assembled "from outside"casing 28, i.e. with shaft 24 and elements thereon being housing into the bore "from the left" as viewed in FIGS. 1 and 2, with bearing 32 mounted first on 24 then gear 22, then bearing 34 (with housing cover 30 attached then to the snap-ring 38) and with removable snap-ring 36 affixed in place finally to restrain these abutting elements from displacement axially inward against the bore periphery (axle 24 being stoppingly coupled to fixed housing 30 through ring 36). Such displacement would readily occur in operation as a result of common inward thrusts; e.g. from gear train 22-20-18 which is commonly beveled so as to induce this.

Focusing now on the mounting arrangement for the inner bearing 32, a sleeve receiving recess 42 is formed in the exterior of the transmission casing 10 about its shaft receiving aperture 44. The recess 42 includes an exteriorly facing annular shoulder 46 that extends radially outward from the bore of the aperture 44. The casing 10 is normally of soft material such as cast iron, and hence the recess 42 may be undercut in the surface of casing with readily available metal removing equipment. A bearing receiving sleeve 48 is secured as by press fit into the bearing receiving recess 42.

Figure 3:
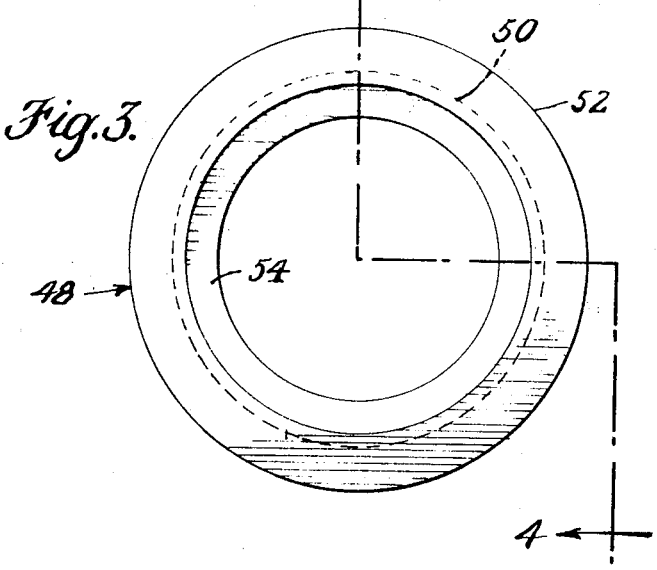
FIG. 3 is a plan view of a preferred bearing sleeve according to the invention.
Figure 4:
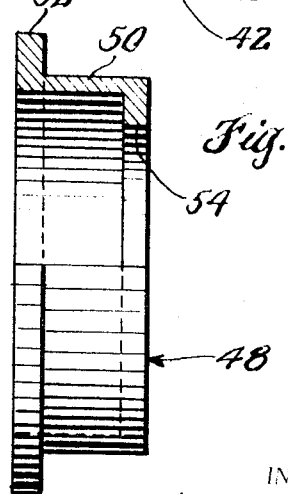
FIG. 4 is a partial sectional view in side elevation of the sleeve shown in FIG. 3 taken along line 4—4 thereof.

As best seen in FIGS. 3 and 4, the sleeve 48 includes a hollow cylindrical barrel section 50 having an integral depending flange 52 extending radially outward from its outer end. A radially inward extending integral flange or ring 54 depends from the other or inner end of the barrel 50 to define bearing retaining means. The sleeve 48 is desirably made of a harder substance than that of the casing, and, most preferably, is of the same material as the gear 22. A conventional material for the latter elements is case hardened steel.

Figure 2:
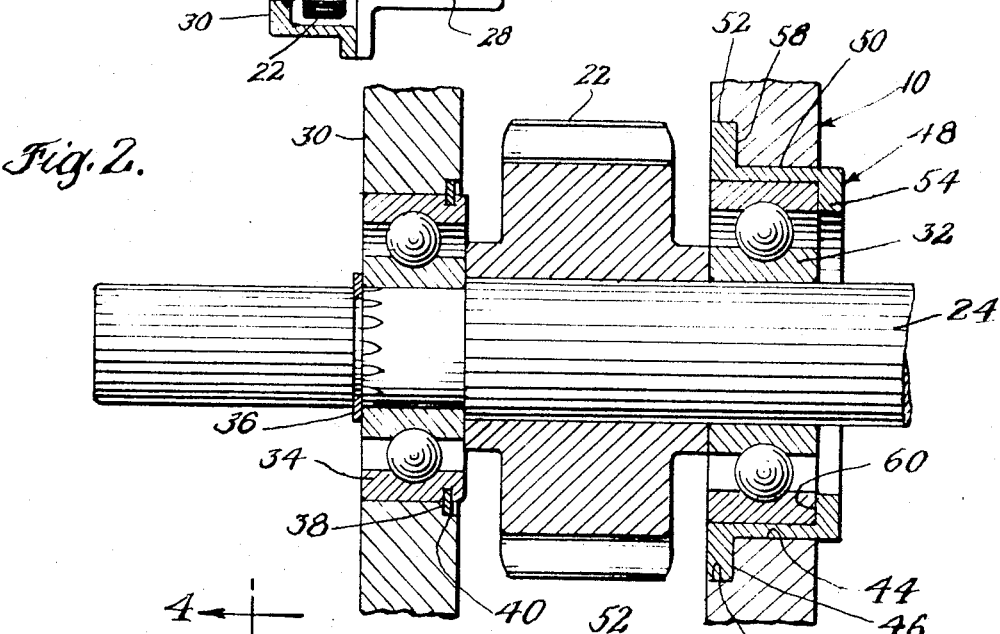
FIG. 2 is a fragmentary sectional view in side elevation of the apparatus depicted in FIG. 1 showing the preferred embodiment of the invention for mounting a gear driven drive shaft to a transmission casing.

As shown in FIG. 2, the sleeve 48 is securely positioned in the recess 42 with the inner face of the flange 52 axially engaging or bearing against the shoulder 46. The preferred means for achieving this result is to provide the barrel 50 with a slightly greater outer diameter than that of the aperture 44 and to press fit the sleeve 48 into the recess 42. If desired, means to prevent rotation of the sleeve 48 relative to the casing 10 may also be employed, such as for example, by forming a notch in the sleeve to receive a corresponding projection on the casing (not shown), or vice versa.

The flange 52 is preferably machined to lie flush with the outer surface of the casing. This operation may be performed either before or after the sleeve is installed. The axial thickness of the bearing retaining means 54 may be selected to afford the strength necessary to resist the axial loads developed in a given installation.

When the sleeve 48 has been so positioned, the inner bearing 32 is then press fit or otherwise secured within the sleeve 48 so that the inner edge of inner bearing 32 engages or bears against the bearing retaining means 54.

Workers in the art will appreciate the advantageous effects of so providing the transfer bearing assembly with the described "annular stop means" (dual-flange collar) serving to couple circumferential portions of the cylindrical bearing assembly to the periphery of the surrounding bore (in gear housing) and thereby arrest displacement thereof in the (inward) axial direction. Inner (transfer) bearing 32 comprises a single, grooved-race ball-bearing and is designed primarily to resist radial forces (applied transverse to the longitudinal axis of shaft 24; as opposed to "thrust"forces which are applied to parallel shaft 24). Of course other analogous anti-friction transfer bearing means may be contemplated, such as an appropriate cylindrical roller (semiradial/thrust) type. Bearing 32 is, of course, not intended to be subjected to massive "thrust forces" such as might drive axle 24 inwardly as described (e.g. mashing gear 22 against the wall of casing 10 at the locus of the annular groove). Such thrust forces can be resisted only by the (right) sidewalls of the ball-receiving groove in the illustrated raceway-rings. Workers in the art will contemplate other forms of stop means as well as alternative anti-friction bearing means adapted to support shaft 24 rotatably in the bore —most especially for applications where the transfer bearing is otherwise unsupported and/or is subject to damaging axial translations, and where the housing bore is at least partly surrounded by a relatively fixed, symmetrically-arranged support structure as in the subject embodiment. Such applications may arise where such damaging axial translations have already occurred with the invention being (then) employed as a means of restoring the structure to operability; alternatively in some cases, the invention may be employed as part of the original fabrication process, to prevent such damage.

Having thus described the preferred embodiment of the invention, it should be appreciated that bearing receiving sleeve 48 significantly increases the resistance of the drive shaft 24 mounting to axial pressures tending to force the transfer gear 22 into the transmission 10 by distributing such forces between the shoulder-sleeve flange interface indicated at 58 and the bearing-bearing retaining means interface indicated at 60.

The bearing mounting of the invention is particularly useful in repairing damaged casings 10. As mentioned above, prior bearing mountings for transmission output transfer gears have been subject to failure under stresses forcing the gear 22 axially into the casing 10. When this occurs, the gear 22 gouges or scores the casing surface surrounding the aperture 44. This damage may be easily repaired by undercutting the damaged portion to form the recess 42. The bearing receiving sleeve 48 is then installed in the recess, the inner bearing 32 secured within the sleeve, and the remaining components assembled in the conventional manner. This procedure is far less expensive than replacing the entire casing because the only new part needed is the comparatively inexpensive sleeve 48. If spare sleeves 48 are not available, their relatively simple configuration enables them to be fabricated "on site" to minimize vehicle downtime.

Moreover, once the repair has been completed, it has been found that the bearing mounting is essentially permanent because its longevity is greater than that of the rest of the transmission.

It is my intention to cover all modifications and equivalents which fall within the spirit and scope of my invention as defined by the appended claims.

What I claim is:

1. In a vehicular transmission of the type having straight drive transmission means for powering a primary drive train; an associated casing; transfer means for powering a secondary drive train and including a driven shaft extending into an aperture in the transmission casing, and an output transfer gear mounted on the shaft, said casing including an aperture adapted for receiving said shaft; and anti-friction transfer bearing means adapted to rotatably journal said shaft in said aperture; said bearing means being subject to displacement in a prescribed axial direction, an improved apparatus for rotatably mounting the gear carrying driven shaft to the transmission casing so as to couple the shaft to the casing rotatably while also arresting translation thereof in said axial direction, said gear being subject to damaging impact against adjacent surfaces as a consequence of such translation; said apparatus comprising:

a. means defining a recess in the surface of the casing around the shaft aperture which terminates at a shoulder extending outwardly from the bore of the aperture;

b. a bearing receiving sleeve securely positioned within said recess, said sleeve including a barrel section disposed within said aperture bore, a flange extending radially outward from the exterior end of said sleeve so as to be disposed within said recess against said recessed shoulder to provide a sleeve flange-recessed shoulder interface, and bearing retaining means extending radially inward from the inner end of said barrel section; and c. said bearing means being secured within said sleeve barrel adjacent said sleeve bearing retaining means to provide a bearing retaining means-bearing interface, the gear carrying shaft passing through the bearing for rotation therein with the transfer gear located exteriorly of said bearing, whereby axial loads on the driven shaft applied in said axial direction are coupled to the casing and thereby resisted through the sleeve flange-recessed shoulder interface and the bearing retaining means-bearing interface.

2. The apparatus of claim 1 wherein said bearing receiving sleeve is press fit into said recess, and said bearing is press fit into said bearing receiving sleeve; and wherein said shaft is coupled to said casing by supplemental axial retainer means coacting with the bearing means to prevent such translation.

3. In a power transmitting arrangement comprising a fixed housing means including a bore portion; drive shaft means journalled in said housing means to be disposed along a predescribed longitudinal axis for rotation thereabout; driven means affixed at a predescribed position on said shaft means to be rotated therewith; antifriction bearing means coupling said shaft means rotatably to said housing means in said bore portion; a retainer means cooperative between said shaft and said housing for maintaining axial placement of said shaft and said driven means relative to said housing when said bearing means is subject to being thrust in a first direction along said axis, whereby said shaft and driven means may also be so thrust, displaced, and thereby damaged or interferred with upon failure of said retaining means; the combination therewith of; annular stop means adapted to couple said bearing means to said housing means at said bore portion and to prevent displacement of said bearing means and thus said shaft means in said axial direction upon failure of said retaining means, said stop means comprising a body portion disposed in said bore and extending along said axis and surrounding said bearing means, a first flange portion disposed at one end of said body portion extending radially inwardly therefrom to engage at least a portion of said bearing means, and a second flange portion disposed at the other end of said body portion and adapted to engage said housing means at the periphery of said bore.

4. In a power transmitting arrangement comprising a fixed housing means including a bore portion; drive shaft means journaled in said housing means to be disposed along a prescribed longitudinal axis for rotation thereabout; driven means affixed at a prescribed position on said shaft means to be rotated therewith; antifriction bearing means coupling said shaft means rotatably to said housing means in said bore portion; said bearing means being subject to being thrust in a first direction along said axis whereby said shaft and driven means may also be so thrust, displaced and thereby damaged and/or interfered with; the combination therewith of;

annular stop means adapted to couple said bearing means to said housing means at said bore portion and, thereby couple said driven means with said shaft means so as to arrest such displacement thereof in said axial direction, said stop means comprises a double flanged collar having a body portion extending along said axis to surround said bearing means; a first flange portion disposed at one end of said body portion and extending radially inward therefrom to engage at least a portion of said bearing means; and a second flange portion disposed at the other end of said body portion and adapted to engage said housing means at the periphery of said bore; and removable axial retainer means affixed at a prescribed location on said shaft for coupling thereof with said housing and so as to secure said driven means and said bearing means on said shaft means in position there along despite being subjected to accidental and deleterious thrusts tending toward said displacement; and wherein said driven means and said bearing means are also supplementarily coupled together to said housing means through said retainer means, this retainer means comprising at least one snap ring between said shaft and housing means.

5. The combination in claim 4 wherein said driven means comprises at least one gear means and wherein said bearing means comprises a radial ballbearing.

* * * * *